United States Patent
Law

(10) Patent No.: US 10,812,398 B2
(45) Date of Patent: Oct. 20, 2020

(54) SYSTEMS AND METHODS FOR RETRANSMISSION RATE SELECTION TO SUPPORT FAST MOVING DEVICES

(71) Applicant: Belden, Inc., St. Louis, MO (US)

(72) Inventor: Lap Kong Law, Freemont, CA (US)

(73) Assignee: BELDEN, INC., St. Louis, MO (US)

( * ) Notice: Subject to any disclaimer, the term of this patent is extended or adjusted under 35 U.S.C. 154(b) by 246 days.

(21) Appl. No.: 15/044,937

(22) Filed: Feb. 16, 2016

(65) Prior Publication Data

US 2017/0237673 A1 Aug. 17, 2017

(51) Int. Cl.
| | |
|---|---|
| *H04L 12/825* | (2013.01) |
| *H04B 17/336* | (2015.01) |
| *H04W 4/02* | (2018.01) |
| *H04B 17/318* | (2015.01) |
| *H04L 1/00* | (2006.01) |
| *H04W 28/02* | (2009.01) |
| *H04W 28/22* | (2009.01) |
| *H04L 1/18* | (2006.01) |

(52) U.S. Cl.
CPC ........... *H04L 47/25* (2013.01); *H04B 17/318* (2015.01); *H04B 17/336* (2015.01); *H04L 1/0002* (2013.01); *H04L 1/0015* (2013.01); *H04W 4/023* (2013.01); *H04W 4/027* (2013.01); *H04W 28/021* (2013.01); *H04L 1/1825* (2013.01); *H04W 28/22* (2013.01)

(58) Field of Classification Search
None
See application file for complete search history.

(56) References Cited

U.S. PATENT DOCUMENTS

| | | | |
|---|---|---|---|
| 7,756,059 B1 | 7/2010 | Bharghavan | |
| 7,864,678 B1 | 1/2011 | Sampath et al. | |
| 2005/0250540 A1* | 11/2005 | Ishii | H04B 1/1027 455/561 |
| 2006/0221847 A1 | 10/2006 | Dacosta | |
| 2010/0067396 A1* | 3/2010 | Cui | H04L 1/0026 370/252 |
| 2011/0059741 A1* | 3/2011 | Klein | H04W 36/30 455/436 |
| 2012/0076010 A1* | 3/2012 | Chu | H04W 28/06 370/252 |
| 2013/0114482 A1* | 5/2013 | Oh | H04L 12/6418 370/310 |

(Continued)

OTHER PUBLICATIONS

Vutukuru et al, "Cross-layer wireless bit rate adaptation", ACM SIGCOMM Computer Communication Review, 39(4), p. 3-14,(2009).

*Primary Examiner* — Jeffrey M Rutkowski
*Assistant Examiner* — Basil Ma
(74) *Attorney, Agent, or Firm* — Foley & Lardner LLP

(57) ABSTRACT

The present disclosure is directed generally to systems and methods for dynamically selecting a retransmission rate for communication between two devices. The retransmission rate may be selected after a transmission has failed between the devices. In some embodiments, the retransmission rate may be selected based on relative velocity of the devices. In some embodiments, the retransmission rate may be selected based on transmission channel characteristics. The retransmission rate may be selected such that the retransmission will be less than an allowable transmission rate based on a distance between the two devices.

14 Claims, 8 Drawing Sheets

(56) References Cited

U.S. PATENT DOCUMENTS

2015/0189537 A1* 7/2015 Chang .................. H04W 28/22
  370/329
2016/0134448 A1* 5/2016 Choi ................... H04L 27/2647
  370/343
2017/0171780 A1* 6/2017 Bhattacharya ........ H04W 28/22

* cited by examiner

SYSTEMS AND METHODS FOR RETRANSMISSION RATE SELECTION TO SUPPORT FAST MOVING DEVICES

FIELD

The present application generally relates to data communication networks and devices. In particular, the present application relates to systems and methods for retransmission rate selection for wireless communication.

BACKGROUND

A device may act as an access point that connects a client device to a network wirelessly. The access point may communicate with the device at a transmission rate. A higher transmission rate may provide greater bandwidth than a lower transmission rate but may also have a shorter range. Signals between the access point and the client device may be degraded by various factors, such as physical obstruction, interference, or distance. Due to signal degradation, some transmissions may fail and need to be retransmitted.

BRIEF SUMMARY

In wireless local area network (WLAN), data transmissions between two devices can make use of multiple physical data rates or transmission rates. The two devices can be access point (AP) to Client in an infrastructure network or AP-to-AP in a peer-to-peer network, etc. While a higher physical data rate provides better data throughput, it requires a higher signal-to-noise ratio (SNR) to work. Rate adaptation is a mechanism for a wireless device to adapt its physical data transmission rate based on the perceived channel condition. Due to wireless channel condition fluctuations, such as shadowing, interference, or noise, a packet transmission using a first selected high physical data rate may fail. To increase the chance that the packet can be delivered successfully, a number of retransmissions using different (typically lower) physical data rates are used.

Rate adaptation is designed to select data rates for transmissions to achieve the highest data throughput. Therefore, the first selected data rate for a packet transmission is usually the highest data rate possible for a given environment and the retransmission data rates are usually the immediate lower data rates (second highest, third highest, and so on). These immediate lower data rates are usually quite similar in terms of SNR requirements to the first selected data rate for the receiver to successfully decode the transmission. This scheme usually is suitable in scenarios where the two communicating devices are stationary, such that received signal strength from each device remains approximately constant. However, if one or both devices are moving quickly, their distance between them can change very quickly over time (e.g., train to trackside, car to stationary access point, plane to tower communication, etc.). This fast change in the channel conditions between the two communicating devices may cause the first selected data rate to fail. The situation could be even worse if the two communicating devices are moving away from each other; in this case, the devices will be separated even further apart from each other after the transmission failures using the first transmission rate. Even if the immediate lower data rate will be used for retransmissions, the channel conditions between the two devices could be so degraded that the transmissions using these data rates will likely to fail as well. This could potentially cause increased latency, packet loss, and/or reduced throughput of the wireless connection.

In order to achieve more reliable data communications for fast moving wireless devices, in some implementations of the methods and systems discussed herein, a rate adaptation mechanism may select a more reliable and yet fastest allowable transmission rates for retransmissions. When selecting the retransmission rates for a packet transmission, the SNR requirements for the retransmission rates will be substantially lower than the previous transmission rate (for example, a SNR difference between the 1st rate and the 2nd rate may be less than a SNR difference between the 2nd rate and 3rd rate, and so on) so that the differences in the SNR requirement of the current retransmission rate can withstand a worst-case degradation in SNR due to the devices moving away from each other. This increases the chance of successful packet delivery as well as reducing the total packet transmission time, and thus increases the overall throughput of the connection. In some implementations, the difference in SNR between the retransmission rates may be determined based on the relative speed of the moving devices in some implementations. In other implementations, the difference in SNR between the retransmission rates may be determined based on observed or measured past receive signal strength fluctuations.

The present application is directed to methods and systems for selecting retransmission rates to support fast moving devices in wireless communication, such as in WLAN. In one aspect, the present application is directed to selecting a retransmission rate to account for the relative velocity of the devices transmitting after a transmission from an access point to a client device fails. Accounting for the relative velocity or past received signal strength fluctuations of the devices allows for better estimates of possible transmission rates, thus increasing the likelihood that the retransmission will succeed.

At least one aspect of the present disclosure is directed to a method for wireless retransmission rate selection. In some embodiments, the method includes transmitting, by a first device to a second device, a data packet at a first rate. The method can include determining, by the first device, to retransmit the data packet. The method can further include identifying, by the first device, a relative velocity between the first device and second device. The method can also include retransmitting the data packet, by the first device to the second device, at a second rate selected responsive to the identified relative velocity or past received signal strength fluctuations.

In some embodiments, the method includes selecting the second rate from a plurality of potential transmission rates, each of the plurality of potential transmission rates corresponding to a required value for a characteristic of a communication channel between the first device and the second device. In some embodiments, the method includes monitoring the characteristic of the communication channel between the first device and second device, and determining that a monitored characteristic is changing at a rate exceeding a predetermined threshold. In some embodiments, the method includes estimating a value for the monitored characteristic at a time period subsequent to a retransmission attempt, based on the rate of change of the monitored characteristic, and selecting a fastest transmission rate of the plurality of potential transmission rates having a corresponding required value for the characteristic less stringent than the estimated value.

In some embodiments of the method, the characteristic comprises a minimum signal to noise ratio of the communication channel. In some embodiments of the method, the characteristic comprises a minimum measured signal strength of a transmission by the second device. In some embodiments of the method, the characteristic comprises a maximum block error rate of the communication channel.

In some embodiments, the method includes monitoring an acceleration of the first device or a change in position of the first device from an identified stationary position of the first device. In some embodiments, the method includes selecting the second rate from a plurality of potential transmission rates, each of the plurality of potential transmission rates corresponding to a minimum acceleration of the first device between the first device and the second device.

At least one aspect of the present disclosure is directed to another method for wireless retransmission rate selection. In some embodiments, the method includes transmitting, by a first device to a second device, a data packet at a first rate having a first required value for a transmission channel characteristic and determining, by the first device, to retransmit the data packet. The method further includes retransmitting the data packet, by the first device to the second device, at a second rate having a second required value for the transmission channel characteristic, and determining, by the first device, to retransmit the data packet again. The method further includes selecting, by the first device, a third rate, and retransmitting the data packet, by the first device to the second device, at the third rate.

In some embodiments, the third rate is selected such that a difference between a third required value of the third rate for the transmission channel characteristic and the second required value is greater than a difference between the second required value and the first required value. In some embodiments of the method, selecting the third rate is performed responsive to identifying, by the first device, a relative velocity between the first device and second device exceeding a predetermined threshold. In some embodiments, the method includes selecting the third rate such that the difference between the third required value and the second required value is greater than a difference between the second required value and the first required value multiplied by a factor proportional to the relative velocity.

In some embodiments of the method, determining to retransmit the packet and determining to retransmit the data packet again are each performed responsive to an expiration of a retransmission time out period for the previous transmission of the packet. In some embodiments of the method, determining to retransmit the packet and determining to retransmit the data packet again are each performed responsive to not receiving a response to the packet within a predetermined time period. In some embodiments of the method, the predetermined time period is based on an average time to receive a response for one or more previously transmitted packets.

In some embodiments of the method, the transmission channel characteristic comprises a minimum signal to noise (SNR) requirement. In some embodiments of the method, the transmission channel characteristic comprises a signal strength of packets received from the second device. In some embodiments of the method, the transmission channel characteristic comprises a maximum block error rate.

At least one aspect is directed to a system for wireless retransmission rate selection. In some embodiments, the system can include a first device. In some embodiments, the first device can include a network interface and a processor executing a transmission rate selector. In some embodiments, the network interface is configured to transmit a data packet from the first device to a second device at a first rate, retransmit the data packet from the device to a second device at a second rate, and retransmit the data packet from the first device to the second device at a third rate. In some embodiments, the transmission rate selector is configured to select the third rate such that a difference between a required value of a transmission channel characteristic for the first rate and a required value of the transmission channel characteristic for the second rate is less than a difference between the required value of the transmission channel characteristic for the second rate and a required value of the transmission channel for the third rate.

In some embodiments of the system, the transmission rate selector is further configured to identify a relative velocity between the first device and the second device, and wherein the third rate is selected such that the difference between the required value of the transmission channel characteristic for the first rate and the required value of the transmission channel characteristic for the second rate is less than the difference between the required value of the transmission channel characteristic for the second rate and the required value of the transmission channel for the third rate multiplied by a factor proportional to the relative velocity. In other embodiments, past measurements of received signal strength or fluctuations in measured received signal strength may be used to determine the third rate.

The details of various embodiments of the disclosure are set forth in the accompanying drawings and the description below.

BRIEF DESCRIPTION OF THE FIGURES

The foregoing and other objects, aspects, features, and advantages of this disclosure will become more apparent and better understood by referring to the following description taken in conjunction with the accompanying drawings, in which.

Figure 1A:
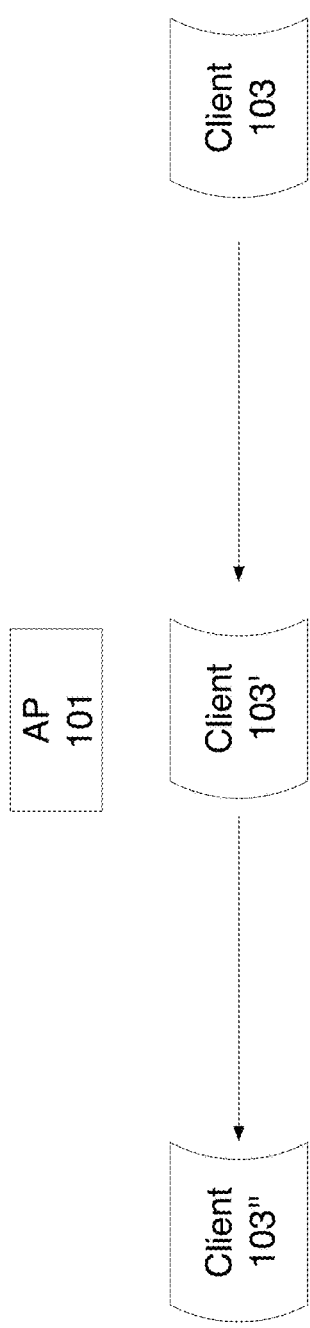
FIG. 1A is a diagrammatic view of an embodiment of an access point and a non-stationary client.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

FIG. 1A is a diagrammatic view of an embodiment of an access point and a non-stationary client. In wireless communication, an access point 101 may connect one or more clients 103 to a network, such as a local area network (LAN), WLAN, or the Internet. In some embodiments, both the access point 101 and the client 103 may be stationary or mostly stationary. For example, an access point 101 may be a wireless router and a client 103 may be a desktop computer. In another example, the client 103 may be a laptop computer or a mobile device that does not move outside the range of the access point 101 that uses a specific transmission rate. In some embodiments, both the access point 101 and the client 103 may be moving together, e.g. in a same vehicle, such that they are not moving relative to each other. In many such embodiments, retransmissions may be made at the same transmission rate as original transmission attempts, as signal strengths and noise levels may remain roughly constant.

In some embodiments, the client may be moving relative to each other. For example, the access point may be located in a train station and the client 103 may be located in a train that at first approaches closer to the train station 103' then travels away from the station 103" (client 103, 103', and 103" accordingly depict the same client in different positions). In another example, the client 103 may be a mobile device that may be inside of a moving automobile. The access point 101 may be a data network provider capable of selecting a transmission rate with a client 103.

When the client 103 is moving relative to the access point 101, a transmission between the access point 101 and the client 103 may fail. For example, the client 103" may be moving away from the access point 101 such that the transmission rate used cannot cover the increased distance between the devices, as signal strength declines proportional to the distance between transmitter and receiver. In another example, the client 103 may move behind an obstacle or receive interference from an antenna that prevents the transmission from succeeding at a particular transmission rate. In some instances, the transmission rate may be set at a lower rate than what is possible, as when the client 103 is approaching the access point 101, because the transmission rate is set when the client 103 is far away but is not changed even when the client 103 is closer 103' to the access point 101.

Figure 1B:
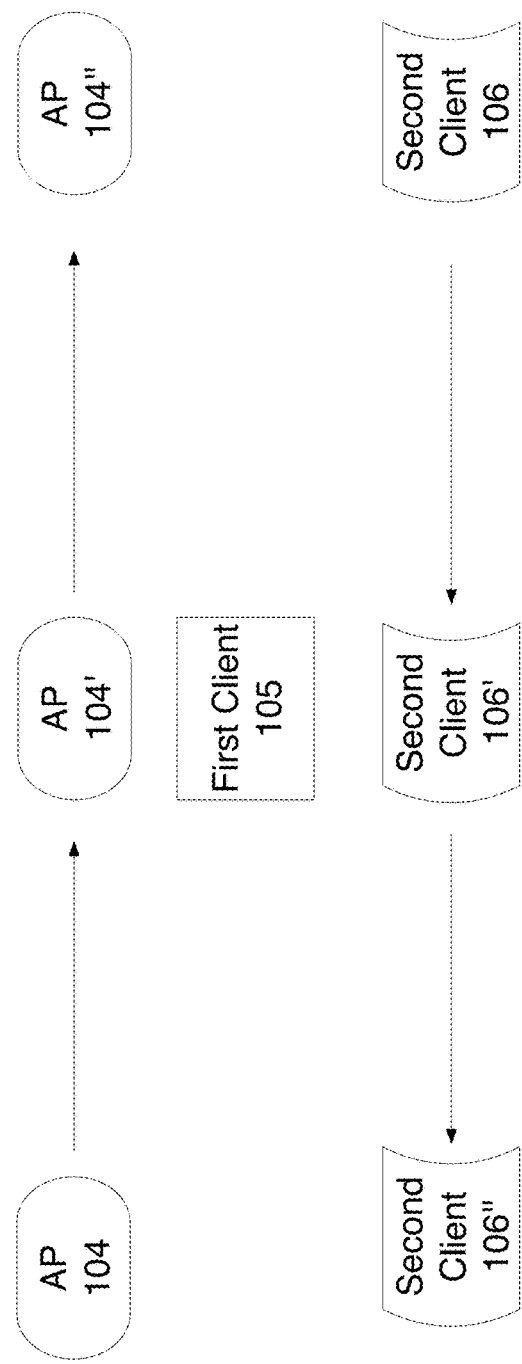
FIG. 1B is a diagrammatic view of an embodiment of a non-stationary access point, a stationary first client and a non-stationary second client.

FIG. 1B is a diagrammatic view of an embodiment of a non-stationary access point 104, a stationary first client 105 and a non-stationary second client 106. In some embodiments, the access point 104 may be in a drone or a moving vehicle such as a balloon, car, train, or an airplane. In some embodiments, the access point 104 may be a mobile phone that creates a WiFi hotspot. A first client 105 may be stationary and the access point 104 may at first move closer 104' to the first client 105 and then move away from the first client 105 (access point 104, 104', and 104" accordingly depict the same access point in different positions). Because the access point 104 may be moving, transmission rate possible between the access point 104 and the first client 105 may increase as the access point moves closer 104' to the first client 105. In other instances, the transmission may fail due to the access point 104 moving farther away 104" from the first client 105. In some instances, clients may also be moving. For instance, a second client 106 may be moving in a different direction compared to the access point 104 (second client 106, 106', and 106" accordingly depict the same second client in different positions). Thus, the transmission rate possible may increase dramatically then drop off dramatically.

Figure 2:
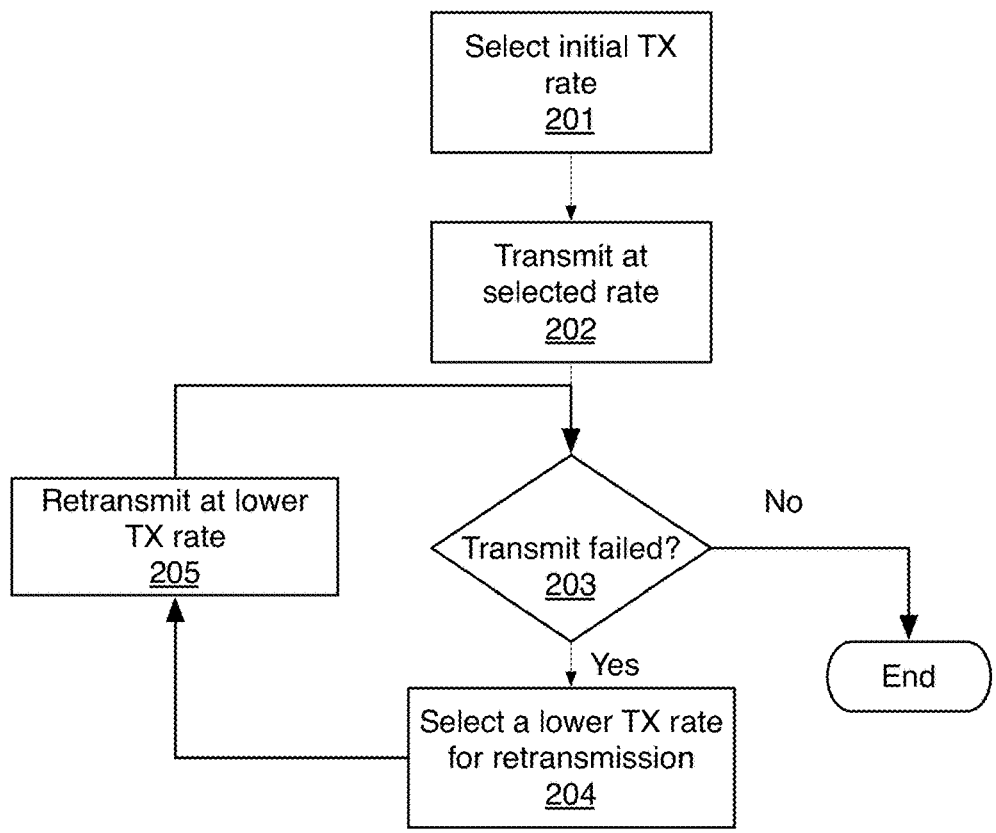
FIG. 2 is a flowchart of an embodiment of a method of stepwise retransmission rate selection.

Referring now to FIG. 2, illustrated is a flowchart of an embodiment of a method of dynamically selecting retransmission rates. In brief overview, at step 201, a device may select an initial transmission (TX) rate. At step 202, the device may transmit at a selected rate. At step 203, the device may determine whether the transmission failed. If the transmission succeeds, the device may not need to perform any retransmissions, and the method may end or repeat for subsequent packets or data until a transmission fails or the connection is closed. If the transmission fails at step 203, then at step 204, the device may select a lower TX rate. The device may try to retransmit the data at the lower transmit rate at step 205. In some implementations, steps 203-205 may be repeated iteratively until successfully transmitting the data. In other implementations, the device may maintain a retransmission counter or timer, and may repeat steps 203-205 up to a predetermined number of times according to the counter or for a predetermined time according to the timer until reaching a retransmission timeout or successfully completing transmission.

Still referring to FIG. 2, and in more detail, at step 201, the device may select an initial TX rate. The device may be referred to as a first device. In some embodiments, the device may be an access point or a client device as described in FIGS. 1A and 1B. The initial TX rate may be a maximum TX rate of the device, which may have a lower range or physical distance that the signal can be transmitted compared to a lower TX rate. The maximum TX rate may be set based on the specifications of the device.

At step 202, the device may attempt to transmit data to another device at a selected rate. The other device may be referred to as a recipient device. For instance, after step 201, an initial TX rate may be the selected TX rate. In some embodiments where the device is an access point, the access point may attempt to send a packet of data to a client device at the initial TX rate.

At step 203, the device may determine whether the transmission to the other device has failed. In some embodiments where the device is an access point, the access point may wait for a response from the client device after sending the transmission at the selected rate. After a predefined period of time (e.g. a retransmission timeout or RTO, used by many lossless transmission protocols), the access point may not receive a reply, indicating that the transmission has failed. In some instances, the access point may receive a reply that comprises too much noise such that data in a received packet cannot be read. In some instances, the access point may receive a reply from the client device indicating that the transmission has failed (e.g. a negative acknowledgement or NACK). If the transmission has not failed, then another transmission may be sent to the other device at the same selected rate. In a further implementation, a device may retransmit a packet several times without waiting for expiration of a retransmission timeout or receipt of a NACK, for example, responsive to detection of high noise levels or increasing noise levels on a transmission channel, or responsive to detection of a fast relative velocity between the device and recipient device. This may be particularly useful in instances in which a retransmission timeout may be very long in comparison to the time in which a device is within transmission range of the other device (e.g. an RTO of several seconds and a device on a train passing a train platform at 50 miles per hour). If the transmission succeeds, then the method may be repeated for additional packets or data, or until the connection is closed.

At step 204, if the transmission has failed, the device selects a lower TX rate to retransmit the failed transmission. The device may then retransmit the data or packet at step 205. The lower TX rate may be lower than the TX rate of the failed transmission. The lower TX rate may have a longer range than a higher TX rate of the failed transmission. If the retransmission fails again at step 205, an even lower TX rate may be selected at step 204. In some instances, a lower TX rate may be selected based on a stepwise function. Differences between retransmission rates may be the same (e.g. 250 Mbps, 200 Mbps, 150 Mbps, etc.), or different (e.g. 250 Mbps, 200 Mbps, 100 Mbps, 20 Mbps, etc.), in various implementations.

Figure 3:
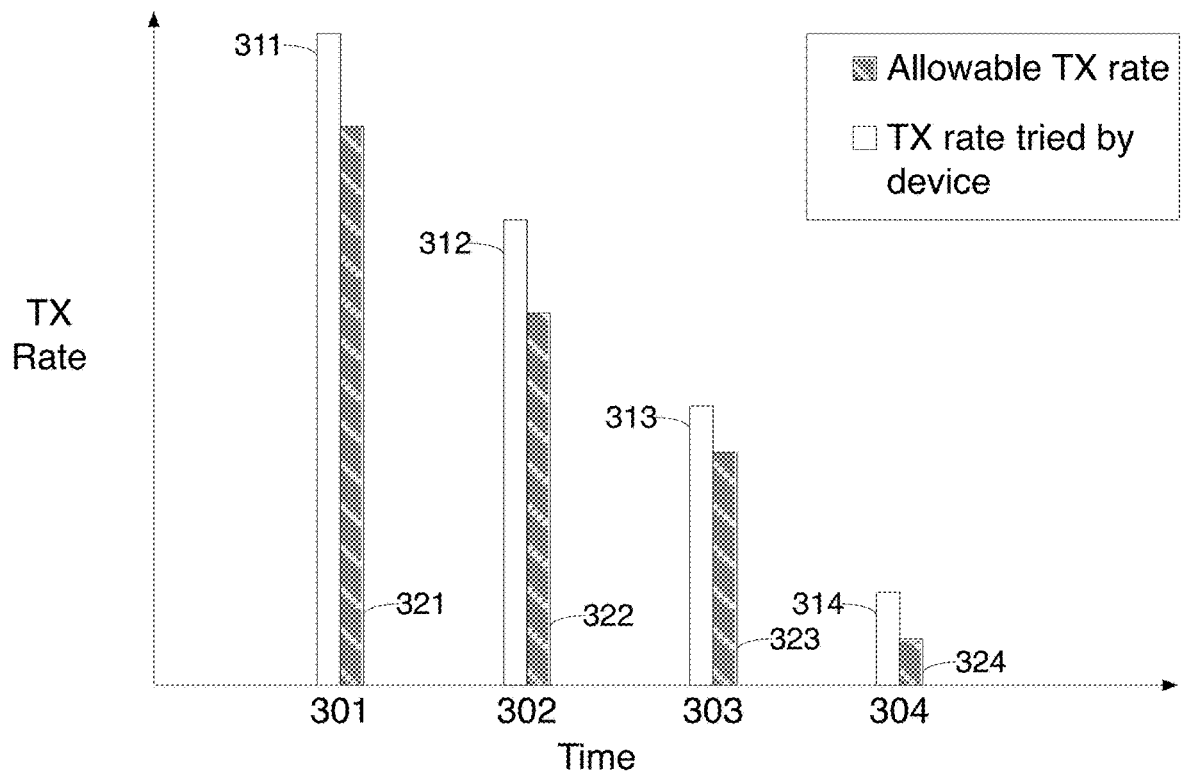
FIG. 3 is a graph depicting an embodiment of a timeline with transmission rates using the dynamic transmission selection of FIG. 2.

FIG. 3 is a graph depicting an embodiment of a timeline with transmission rates selected using a stepwise transmission rate selection method. When the distance between a first device and a second device is changing, then the allowable TX rate will vary over time due to the varying distance between the devices. For instance at time 301, the two devices may start relatively close to one another, and thus the maximum allowable TX rate based on the distance may be relatively high at 321. In some instances, the devices may move away from each other, and the maximum allowable TX rate may decrease: at time 302, for instance, the allowable TX rate may decrease to 322; at time 303, the allowable TX rate may yet again decrease to 323; and at time 304, the allowable TX rate may yet again decrease to 324.

Using one implementation of the method described in relation to the flowchart of FIG. 2, the devices may initially attempt to transmit at a higher rate than the maximum allowable rate, and thus the transmission may fail. For instance, at time 301, the TX rate 311 may be greater than the allowable TX rate 321. In some instances, at an early point in time, the access point may have successfully transmitted to the client device at the TX rate of 311, and so the access point may continue to attempt to transmit at that rate. In other instances, when the access point is connecting to a new client device, the access point may attempt to transmit at a high transmit rate 311, which may be the highest TX rate possible on the access point. However, at time 301, because the TX rate 311 is greater than the allowable TX rate 321, the transmission may fail. At the next time increment 302, the access point may attempt a lower TX rate 312 to retransmit the failed transmission. However, due to the increased distance between the devices, the allowable TX rate 322 also decreased, and the retransmission fails again. This step may repeat at times 303 and 304 and with the TX rates tried by the device at 313 and 314. As the distance between the devices may be continually increasing, each subsequent attempt to retransmit may fail, when at some particular points in time such as at 302, 303, and 304, a lower TX rate may have succeeded.

Figure 4:
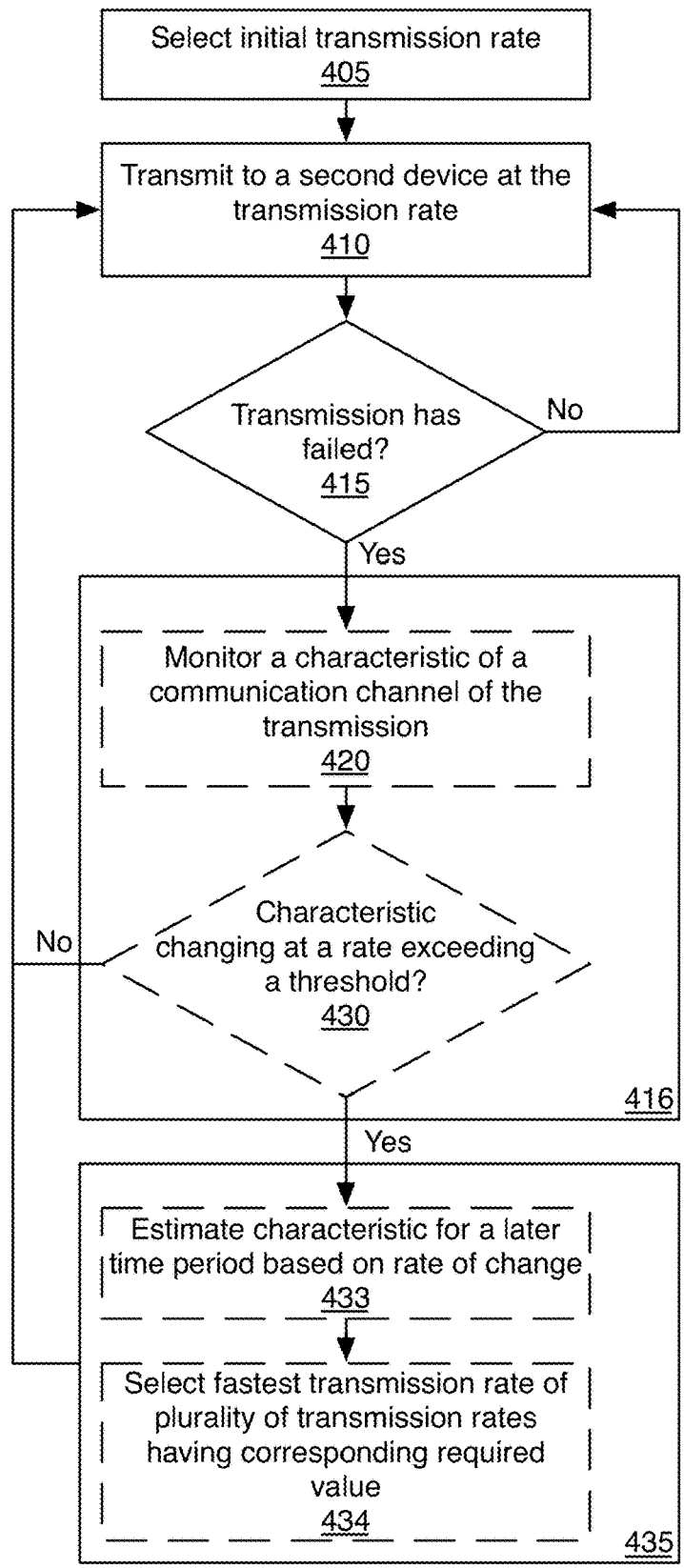
FIG. 4 is a flowchart of an embodiment of a method of dynamically selecting transmission rate responsive to monitoring a communication.

In many implementations, a retransmission timeout may be very short or may be too brief to allow a device to monitor channel conditions or obtain feedback regarding channel characteristics in between retransmissions of the same packet or data. In some such implementations, the device may periodically or continuously monitor channel characteristics (such as measuring received signal strength from the destination device, measuring noise levels, etc.). This may be done via monitoring of received data packets or by a periodic data exchange (e.g. ping, null data, etc.) in the absence of regular data traffic. Changes or fluctuations in these channel characteristics may be used to make predictions or estimations of future characteristics, and retransmission rates may be selected accordingly. FIG. 4 is a flowchart of an embodiment of a method of dynamically selecting transmission rate responsive to monitoring a communication. In brief overview, at step 405, a device may select an initial transmission rate. At step 410, the device may transmit to a second device at the transmission rate. At step 415, the device may determine whether the transmission has failed. If the transmission has succeeded, then the device may transmit another packet of data to the second device at the same transmission rate at step 410. At step 416, if the transmission has failed, then the device may identify a relative velocity between the device and the second device. Identifying the relative velocity may comprise the device monitoring a characteristic of a communication channel of the transmission at step 420, and the device determining whether the characteristic is changing at a rate exceeding a threshold at step 430. If the characteristic is changing at a rate below the threshold, in some implementations, the device retransmits at the previous transmission rate at step 410. In other implementations, the device may select a next lower transmission rate, as discussed above in connection with FIG. 2. If the rate exceeded the threshold, at step 435, the device may select a new transmission rate. The device may then attempt to retransmit the packet at the new transmission rate. Selecting a new transmission rate may comprise the device estimating the characteristic for a later time period based on rate of change at step 433, and the device selecting a fastest transmission rate of a plurality of transmission rates having a corresponding required value at step 434.

Still referring to FIG. 4, and in more detail, at step 405, the device may select an initial transmission (TX) rate. The device may also be referred to as a first device. In some embodiments, the device may be an access point or a client device as described in FIGS. 1A and 1B. The initial TX rate may be a maximum TX rate of the device, which may have a lower range or physical distance that the signal can be successfully transmitted or received compared to a lower TX rate. The maximum TX rate may be set based on the specifications of the device. In some embodiments, the device may select a preconfigured TX rate as the initial TX rate. In some embodiments, the device may select a minimum TX rate as the initial TX rate, where the minimum TX rate is the lowest TX rate possible on the device. In other embodiments, the device may determine an initial transmission rate during establishment of the connection via a rate negotiation mechanism.

At step 410, the device attempt to transmit data to a second device at a selected rate. For instance, after step 405, an initial TX rate may be the selected TX rate. The second device may be referred to as a recipient device. In some embodiments where the device is an access point, the access point may attempt to send a packet of data to a client device at the initial TX rate. In some embodiments, the device may send a plurality of transmissions at the selected transmission rate. The plurality of transmissions may be sent sequentially. In some embodiments, the transmission may comprise a transmission control protocol (TCP) synchronization (SYN) packet, while in other embodiments, the transmission may comprise a data packet.

At step 415, the device may determine whether the transmission to the second device has failed. In some embodiments, the device may determine whether to retransmit the transmission. In some embodiments, the device may wait for a response, a reply, or an acknowledgment (ACK) from the recipient device after sending the transmission at the selected rate. In some embodiments, the recipient device may be configured to send back an ACK packet after receiving the transmission from the first device. After a predefined period of time, or a timeout period, the first device may not receive a reply from the second device, indicating that the transmission has failed. In some instances, the first device may receive a reply that has a signal to noise ratio or another channel characteristic below a predetermined threshold. In some instances, the first device may receive a reply from the recipient device indicating that the transmission has failed (e.g. a NACK packet, which may be sent responsive to receipt of a packet having a signal to noise ratio or other characteristic below a threshold, responsive to a timeout of an expected transmission period, or any other such determination). If the transmission has not failed, then another transmission comprising another packet may be sent to the recipient device at the same selected rate. In some embodiments, if the transmission has not failed, then another transmission comprising another packet may be sent to the recipient device at a higher transmission rate. In some embodiments where the device had sent a plurality of transmissions, a timeout period corresponding to the first of the plurality of transmission may have elapsed, indicating that the first transmission has failed. In some embodiments, step 415 may be skipped, such as where transmission channel characteristics (e.g. noise, signal strength, etc.) are quickly degrading, and the device may immediately select a lower transmission rate at step 416 and retransmit the packet at 410. This may be helpful in instances where the potential time to successfully transmit a packet (e.g. while the devices are within range) is less than a retransmission timeout period.

At step 416, if the transmission has failed, then the device may identify a relative velocity between the device and the second device. In some embodiments, the device may make assumptions about whether the device or the second device is stationary, and so the relative velocity may be calculated with either the velocity of the device or the velocity of the second device. In some embodiments, the relative velocity may be calculated with both the velocity of the device and the second device. Location of the device and/or the second device may be identified to calculate the relative velocity. In some embodiments, relative velocity may be used to calculate a relative location of the device and the second device. In some embodiments, a relative location between the device and the second device may be used. In some embodiments, location and/or velocity may comprising monitoring an acceleration of the device or the second device. In some embodiments, location and/or velocity may comprise monitoring a change in position of the device or the second device from an identified stationary position of the device or the second device. In some embodiments, the device or the second device may use a directional antenna instead of an omnidirectional antenna. The relative location or the relative velocity may be used with the direction of the directional antenna. For instance, the relative location may indicate that the second device will be within the range and direction of the directional antenna. In some embodiments, the communication channel between the devices may use beamforming, which may be used to determine the relative velocity.

In some embodiments, the relative velocity and/or location may be calculated using sensors and/or location monitoring located within the device or the second device. For instance, the device and/or the second device may comprise or connected to an accelerometer, global position system (GPS), speedometer, altimeter, gravity sensors, gyroscopes, rotational vector sensors, orientation sensors, magnetometers and/or other sensors and systems. Location and/or velocity may be calculated via trilateration or triangulation.

In some embodiments, if the transmission rate selected by the device is below a minimum threshold, then the device may determine to not send another transmission. The minimum threshold may be preconfigured for the device. In some implementations, any transmission rates below the minimum threshold may only allow transmission of data packets that are smaller than a standard size.

As discussed above, in some implementations of step 416, relative velocity and/or positions of the devices may be determined through explicit determinations of location, acceleration, etc. In other implementations, at step 420, identifying a relative velocity may be performed implicitly, and may comprise the device monitoring a characteristic of a communication channel of the transmission. The characteristic may comprise a minimum signal to noise ratio, minimum signal strength of a transmission, or maximum block error rate. In some embodiments, the characteristic may comprise a maximum bit error rate, a minimum received signal strength indicator, a standing wave ratio, a maximum signal to interference and noise ratio, a signal to interference plus noise and distortion ratio, and/or any other such characteristic. The device may monitor one or more characteristic of the transmission by examining, for example, a background noise or interference on a particular frequency, determining a number of blocks or bits that includes errors, or determining a power level received by an antenna of the device. In other implementations, relatively velocity may be determined through a combination of explicit and implicit means. For example, a device may have access to its own location or position information via a GPS sensor or accelerometer of the device, and may determine that a second device has a relative velocity implicitly through changing signal strength of the second device's transmissions.

In some embodiments, one or more characteristics of the communication may be stored in a memory location or cache of the device. In some embodiments, the characteristic may be stored in association with a second device identifier, frequency, channel and/or time of the transmission or reply. In some embodiments, a change in the characteristic may be stored in association with the communication. In some implementations, memory may be limited by size such that only a predefined number of latest characteristics may be stored for each client device or second device. In some embodiments, a rate of change in the characteristic may be stored in relation to the characteristic, by comparing the measured characteristic with a previous characteristic stored in memory.

At step 430, in some embodiments, identifying a relative velocity may comprise the device determining whether the characteristic is changing at a rate exceeding a threshold. The threshold may be specified in a memory or storage element of the device. The threshold may be defined such that minor variations in characteristics may be ignored when determining whether to retransmit a failed transmission using a new lower transmission rate. For instance, minor variations may be due to inherent errors due to sensor deviations, numerical errors, and/or signal propagation variations (e.g. location of obstacles between the devices). In some embodiments, the threshold may be defined such that small movements in the devices do not affect the transmission rate. For instance, a mobile phone connected to a WiFi network may move several feet within a room. Although a characteristic may change, the access point may keep using the same transmission rate. The threshold may be a static value or it may be changed by a firmware and/or other software. The threshold may be stored in association with a different type of communication channel. For instance, one channel may have one threshold value, and another channel may have a different threshold value. If the characteristic is not changing at a rate exceeding the threshold, the packet or data may be retransmitted to the second device using the same transmission rate. If the characteristic is changing at a rate exceeding the threshold, the devices may be moving away from each other and the method may continue to step 435 of identifying a new transmission rate. For example, the characteristic may be a signal to noise ratio (SNR), and the change in signal to noise ratio may be −10 decibels (dB). In other words, if the SNR drops by 10 dB, then the first device may identify a new transmission rate at step 435.

At step 435, the device may select a new transmission rate. In some embodiments, the new transmission rate may be lower than a previously used transmission rate. In some embodiments, the device may have identified a relative velocity between the device and the second device at 416, and the new transmission rate may be based on the relative velocity. For instance, the relative velocity rate may be used to estimate the distance between the devices at a time when the retransmission will be sent at the next iteration of step 410, and the new transmission rate may be selected such that a range corresponding to the new transmission rate may be greater than or equal to the estimated distance. In some embodiments, the relative velocity may be combined with a location of the device and/or the second device to calculate the estimated distance. In some embodiments, a memory element may include a change in transmission rate or the retransmission rate that corresponds to distance, estimated distance, and/or relative velocity.

As discussed above, received signal strength and signal to noise ratios may vary as a function of distance, and accordingly may also be dependent on relative velocity between two devices. As devices move part, the distance between them may grow in a linear or non-linear fashion. For example, given a first device on a train on a straight track approaching, passing, and receding a platform, the distance from the first device to a second device on the platform will be initially very large and will decrease relatively slowly. However, as the train approaches the platform, the distance will decrease to a lowest amount when the train is adjacent to the platform, with the change in distance increasing to a maximum relative velocity at the same point. Similarly, as the train recedes, the relative velocity will decrease as the distance increases. Accordingly, a retransmission rate may depend on both distance and relative velocity between the devices. In some implementations, these distances may be measured directly, such as via GPS or other location services. In other implementations, the distances may be estimated via received signal strength. Similarly, the relative velocities may be estimated based on a rate of change of the measured or estimated distances. In still other embodiments, the distances and/or relative velocities may be determined indirectly via a measurement of an acceleration of the first device, such as measured via an accelerometer of the device. The estimated distance and relative velocities may be used in selecting the new transmission rate from a plurality of potential transmission rates. The device may estimate the worst case distance separation between the devices after a first transmission as failed (since the retransmission timeout and transmission time is known), such that the device may determine the corresponding retransmission rate that has the greatest chance of success and produce an appropriate throughput.

In some embodiments, the new transmission rate may be selected based on a value of a characteristic or a rate of change in value of characteristic of a communication channel between the devices. In some embodiments, the device may have determined that a characteristic of a communication channel between the devices is changing at a rate greater than a threshold at step 430. In some embodiments, the new transmission rate may be selected from a plurality of potential transmission rates, each of the plurality of potential transmission rates corresponding to a required value for a characteristic of a communication channel between the device and the second device. For instance, the plurality of potential transmission rates may be stored in a memory element, and each of the potential transmission rates may be stored with a corresponding required value for the characteristic. For example, the memory element may store a table with entries of 10 dB corresponding to 1 megabits per second (Mbit/s), 20 dB corresponding to 10 Mbit/s, 30 dB corresponding to 100 Mbit/s, and 40 dB corresponding to 300 Mbit/s. In some embodiments, the value of the characteristic may be used to calculate the transmission rate (e.g. multiplying and adding constant values) instead of looking up corresponding values in a table. In some embodiments, the rate of change of value of the characteristic may be used to calculate a new transmission rate or the change in the transmission rate. For instance, the SNR may have dropped by 10 dB per sec (dB/s), and the transmission rate may be lowered by a corresponding amount, using a table stored in memory or by calculation from the drop. The table in memory may store, for instance, a drop in 10 dB/s corresponding to a drop in 30 Mbits/s of transmission rate. Those having the ordinary skill in the art will recognize that different units of measurements may be used and that a device will have different capabilities of range and power of the signals it can produce.

At step 433, in some embodiments, selecting a new transmission rate may include estimating a value of the characteristic for a later time period based on the rate of change. The device may estimate a value for the monitored characteristic at a time period subsequent to a retransmission attempt, based on the rate of change of the monitored characteristic. For instance, the rate of change for the characteristic may be −10 dB/s and the current SNR may be 35 dB. The device may estimate that at a time of retransmission (e.g. 1 second later), the SNR will likely be 25 dB. In some embodiments, the device may add the rate of change and the current value of the characteristic. In some embodiments, the estimate may take into account a time difference between retransmission time and the time of when the value of the characteristic was measured. For instance, the retransmission time may be in 0.1 seconds, the rate of change may be −5 dB/s, and the current value of the characteristic may be 35 dB. The estimate for the SNR at the next retransmission time may be:

$$-5 \text{ dB/sec} * 0.1 \text{ sec} + 35 \text{ dB} = 34.5 \text{ dB}$$

In some embodiments, a plurality of rates of change may be used to estimate the value of characteristic for a later time period. For instance, the last two rates of change may be averaged and combined with the current value of the characteristic to estimate the value of characteristic for a later time period. In some embodiments, multiple rates of change may be used to calculate a rate of change of the rates of change.

At step 434, in embodiments that include estimating the characteristic for a later time period, selecting a new transmission rate may include selecting a fastest transmission rate of a plurality of transmission rates having a corresponding required value for the characteristic less stringent that the estimated value. For instance, the estimated value may be 34.5 dB for SNR. The plurality of transmission rates may include 1 Mbit/s, 10 Mbit/s, 100 Mbit/s, and 300 Mbit/s, or any other such values. Each transmission rate of the plurality of transmission rates may correspond to a required value for the characteristic. For instance, 300 Mbit/s may correspond to 40 dB, 100 Mbit/s to 30 dB, 10 Mbit/s to 20 dB, and 1 Mbit/s to 10 dB. For an estimated value of 34.5 dB, 100 Mbit/s may be selected because it corresponds to a required value of 30 dB for the SNR that is less stringent than the estimated value. In another instance, for an estimated value of 29.5 dB, 10 Mbit/s may be selected. The plurality of transmission rates may be stored in a memory table or be calculated based on the estimated value. After a new transmission rate is calculated, the device may attempt to retransmit the data or packet to the second device at step 410.

Figure 5:
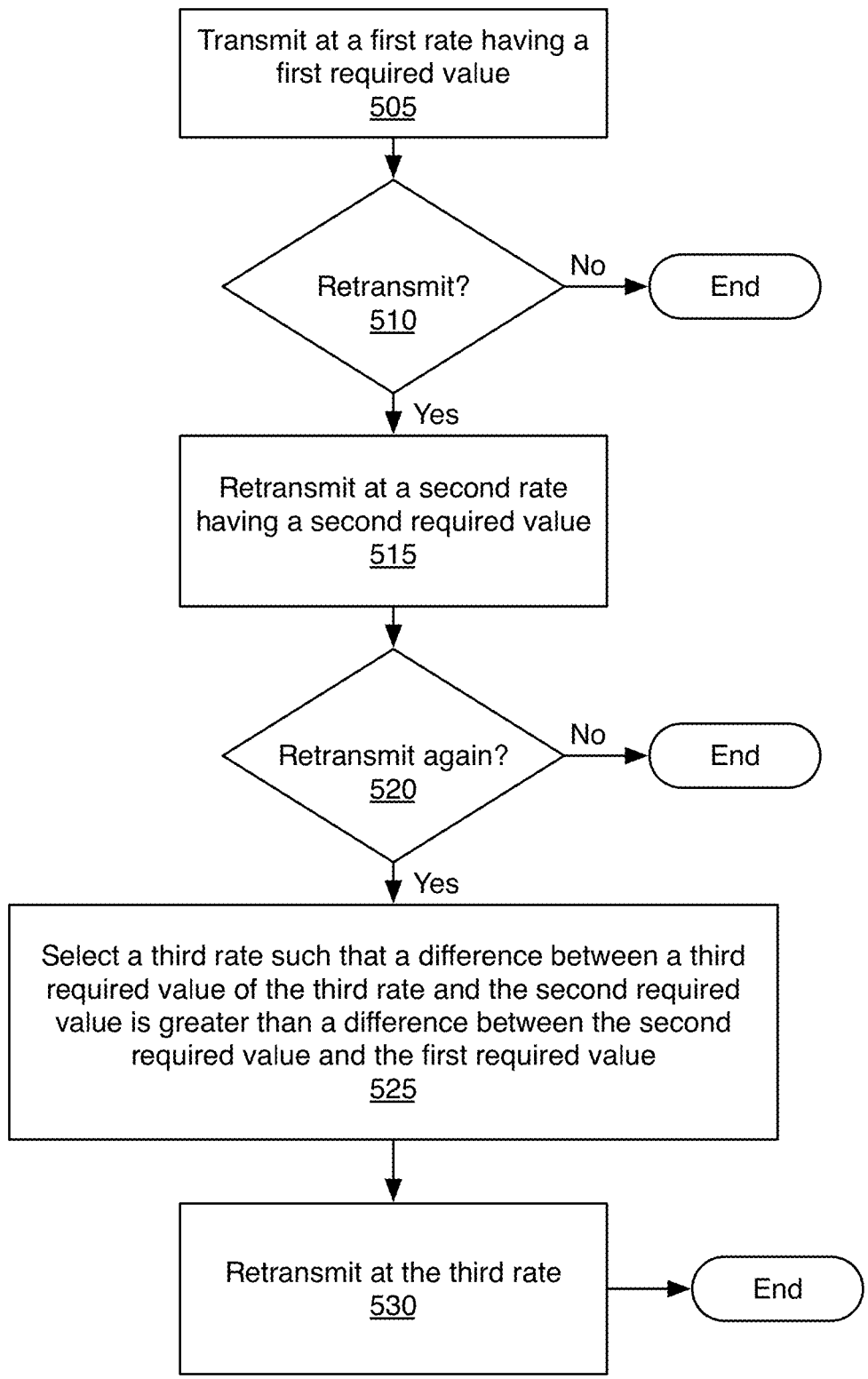
FIG. 5 is a flowchart of an embodiment of a method of dynamically selecting transmission rate responsive to differences in transmission rates.

FIG. 5 is a flowchart of an embodiment of a method of dynamically selecting transmission rate responsive to differences in transmission rates. In brief overview, at step 505, a device may transmit to a second device at a first rate having a first required value. At step 510, the device may determine whether to retransmit. If no retransmission is necessary, then the method ends for that packet or data, and the next packet or data may be transmitted. If retransmission is necessary because the first attempt failed or if the device determines to retransmit the packet, then at step 515, the device retransmits at a second rate having a second required value. At step 520, the device determines whether another retransmission is necessary. If retransmission was successful, the method ends. If not, at step 525, the device selects a third rate. In some embodiments, a difference between a third required value of the third rate and the second required value may be greater than a difference between the second required value and the first required value. In other embodiments, the third rate may be selected to be lower than the second rate by a predetermined amount, based on a predetermined multiplier, or may be a next lower rate in a table or list of predetermined transmission rates. At step 530, the device retransmits again at the selected third rate. Still referring to FIG. 5, and in more detail, at step 505, a first device may transmit, to a second device, a data packet at a first rate having a first required value for a transmission channel characteristic. In some embodiments, the first rate may be the maximum transmission rate of the device. In some embodiments, the first rate may be an initial transmission rate used for new connections or new clients. In some embodiments, the first rate may be a minimum transmission rate. The first rate may correspond to a first required value for a transmission channel characteristic. The first rate and the corresponding first required value may be stored in a memory element of the first device. The transmission channel characteristic may be, for instance, a minimum SNR, a signal strength of packets received from the second device, a maximum block error rate, a maximum bit error rate, a minimum received signal strength indicator, a standing wave ratio, a maximum signal to interference and noise ratio, a signal to interference plus noise and distortion ratio, and/or any other such characteristic. For instance, the first rate may be 300 Mbit/s which may correspond to a value of 40 dB for a characteristic of minimum SNR. In some embodiments, a timeout period may correspond to the transmission, during which a response is expected to be sent from the second device to the first device (e.g. an ACK packet, a response, etc.). The first device may then wait for a response from the second device, or send subsequent packets with the same first rate until a response is received or a timeout period associated with the transmission is reached.

At step 510, the device may determine whether to retransmit the packet. In general, this step may be similar to step 415 described in relation to FIG. 4. The determination may be based on whether the first transmission at step 505 has failed. In some embodiments, detecting whether the first transmission has failed may include detecting that a response, a reply, or an acknowledgement has not been received within a time out period corresponding to the first transmission. In other words, the determination to retransmit is based on an expiration of a retransmission time out period for the previous transmission of the packet. The time out period may be based on a protocol used in the transmission and/or specified in the data packet. In some embodiments, the determination to retransmit the packet is performed responsive to not receiving a response to the packet within a predetermined time period. In some embodiments, the predetermined time period may be less than the time out period. In other embodiments, the predetermined time period may be longer than the time out period. In some embodiments, the shorter of the timeout period and the predetermined time period may be used to determine whether to retransmit the packet; in other embodiments, the longer of the time out period and the predetermined time period may be used. In some embodiments, the predetermined time period may be based on an average time to receive a response for one or more previously transmitted packets.

In some embodiments, a response may be received by the first device indicating that the first transmission has failed. In some embodiments, a response received by the first device or the transmission sent by the first device may have a channel characteristic above or below the first required value for the transmission channel characteristic that correspond to the first rate. For instance, if the first rate was 300 Mbit/s and corresponds to a value of 40 dB, the first device may determine to retransmit the data packet if the transmission channel characteristic is below 40 dB. If the first transmission has not failed, then the first device may not need to retransmit the packet to the second device. In other implementations, the first device may determine to retransmit the packet without waiting for expiration of a time out period. For example, in one such implementation, the first device may immediately retransmit the packet, responsive to a high packet loss rate for previous packets. In another such implementation, the first device may retransmit the packet responsive to a channel characteristic degrading faster than a retransmission timeout period. For example, if a first packet with a time out period of 5 seconds is transmitted on a channel having a SNR of 50 dB, at a transmission rate requiring a minimum SNR of 30 dB, and one second later, the device detects that the SNR has degraded to 40 dB (−10 dB/second), the device may determine that if the device waits for the full time out period to retransmit the packet, the SNR of the channel may be at an unusable level. Accordingly, in such implementations, the device may retransmit the packet, responsive to the quickly degrading channel characteristic. In a further implementation, the device may select a lower transmission rate and retransmit the packet, the rate selected based on the detected rate of degradation.

At step 515, if the first transmission has failed, the device may retransmit the packet at a second rate having a second required value for the transmission channel characteristic. In some embodiments, the second rate may be lower than the first rate. In some embodiments, the second rate may be a predefined rate. In some embodiments, the second rate may be determined as described in relation to FIG. 2. For instance, a lower transmission rate may be selected based on a stepwise function. In some embodiments, the second rate may correspond to a second required value for the transmission channel characteristic. In some embodiments, the second rate may be determined dynamically as described in relation to FIG. 4. For instance, the second rate may be determined based on the relative velocity between the first and the second device. The second rate and the corresponding second required value may be stored in a memory element of the first device. In some embodiments, the first and second rates and the corresponding first and second required values may be stored in the memory element of the first device. In some embodiments, a table may store all the rates and the corresponding required values. Each entry in the table may include a transmission rate and a corresponding require value. The table may be in descending or ascending order of transmission rates. In some embodiments, each any two adjacent entries of the table may include transmission rates that has a same interval as every other adjacent entries of the table. In other words, the entries in the table may be equally spaced out. In some embodiments, the second rate may have the same units of measurement as the first rate. In some embodiments, the first required value may be in the same units of measurement as the second required value; in other embodiments, they may be different characteristics and/or have different units of measurements. For instance, the first required value may be for a SNR characteristic, while the second required value may be a percentage value that is a block error rate characteristic. Although primarily discussed in terms of lower rates, in some implementations, the second rate may be a higher or faster transmission rate. For example, if channel characteristics are quickly improving (e.g. as a device approaches the recipient device), then a faster retransmission rate may be selected, responsive to the higher likelihood of successful communication.

At step 520, the first device may determine whether to retransmit the data packet again. This step may be similar to step 510. If the retransmission in step 515 has failed, or if the transmission channel characteristic is below the second value, the first device may attempt to transmit the data packet yet again. In some embodiments, the determination to retransmit is based on an expiration of a retransmission time out period for the previous transmission of the packet. The time out period may be based on a protocol used in the transmission and/or specified in the data packet, may be determined during a handshaking procedure, may be preconfigured by an administrator, may be determined dynamically based on a packet loss rate, or any other source.

At step 525, the first device may select a third rate. The third rate may be lower than the second rate and may be such that a difference between a third required value of the third rate for the transmission channel characteristic and the second required value is greater than a difference between the second required value and the first required value. For instance, the first transmission rate may be 300 Mbit/s and the second transmission rate may be 250 Mbit/s. The difference between the first transmission rate and the second transmission rate would be 50 Mbit/s, and the third rate may be selected such that the difference between the third rate and the second rate is greater than 50 Mbit/s. For instance, the third rate may be 150 Mbit/s.

In some embodiments, the third rate may be selected from a table with each entry including a transmission rate and a corresponding required value. The first and second rates may be included in the first two entries of the table. In some embodiments, if the entries are equally spaced out, the third rate may be selected from the fourth entry of the table. In some embodiments, entries may not be equally spaced out, and the difference between the first and second rates may be calculated. The difference may then be used with the second rate to find a transmission rate threshold. The third rate may be selected from the table based on the transmission rate threshold. For instance, the third rate may be a rate that is the largest transmission rate below the transmission rate threshold.

In some embodiments, the third rate may be selected responsive to identifying, by the first device, a relative velocity between the first device and second device exceeding a predetermined threshold. For instance, the relative velocity between the first device and the second device may be identified as described in relation to step 416 of FIG. 4. In some embodiments, the predetermined threshold may indicated the rate at which the devices are moving away from each other. For instance, the relative velocity may be 10 meters for second (m/s), with a direction of east. The predetermined threshold may apply just to the magnitude of the relative velocity. In some embodiments, the third rate may be selected responsive to identifying a change in distance between the devices exceeding a predetermined threshold. In some embodiments, the third rate may be selected responsive to identifying a distance between the devices exceeding a predetermined threshold. For instance, the distance between the devices may exceed 100 meters, at which point a third rate may be selected. In some embodiments, selecting a third rate further comprises selecting the third rate such that the difference between the third required value and the second required value is greater than a difference between the second required value and the first required value multiplied by a factor proportional to the relative velocity. The factor may be calculated from the relative velocity. In some embodiments, the factor may be the magnitude of the relative velocity multiplied by any number between 0.01 and 100. The factor may then be multiplied to the difference between the second required value and the first required value.

For example, the first required value may be 40 dB, and the second required value may be 30 dB, for a difference of 10 dB. The factor, calculated based on the relative velocity or change in distance, may be 1.2. The difference may be multiplied by the factor, resulting in a product of 12 dB. The third required value may thus be the second required value minus the product, resulting in 18 dB. The third transmission rate may correspond to the third required value or calculated from the third required value. For instance, the third transmission rate may be selected from a plurality transmission rates in a table that corresponds to a required value that is closest to, or is bounded by the third required value. For instance, the third required value may be 18 dB, and the entries in the table may correspond to required values of 20 dB, 15 dB, and 10 dB. The entry that includes the required value of 15 dB may be selected because it includes a largest required value less than the third required value. In other embodiments, the third required value may be used to calculated the transmission rate.

In some embodiments, if the selected retransmission rate is lower than a predefined threshold, the first device may determine not to send a retransmission. In some embodiments, the predefined threshold may be set such that a data packet that is sent below the threshold may be smaller than a standard packet size.

At step 530, after the third transmission rate has been selected, the first device may retransmit the data packet at the third transmission rate. In some embodiments, if the retransmission at the third rate fails, the first device stops communication with the second device. In some embodiments, if the retransmission at the third rate fails, there may be another retransmission with a fourth transmission rate calculated or selected similar to step 525. In some embodiments, if there was a successful transmission, another data packet may be transmitted with the transmission rate that was used for the successful transmission. In some embodiments, another data packet may be transmitted with a new transmission rate, where the new transmission rate may be selected responsive to the relative velocity or other channel characteristic of the successful transmission, similar to step 525. In some embodiments, if there was a successful transmission, the difference between the third rate and the second rate may be used to select a fourth transmission rate to send the next data packet.

Figure 6A:
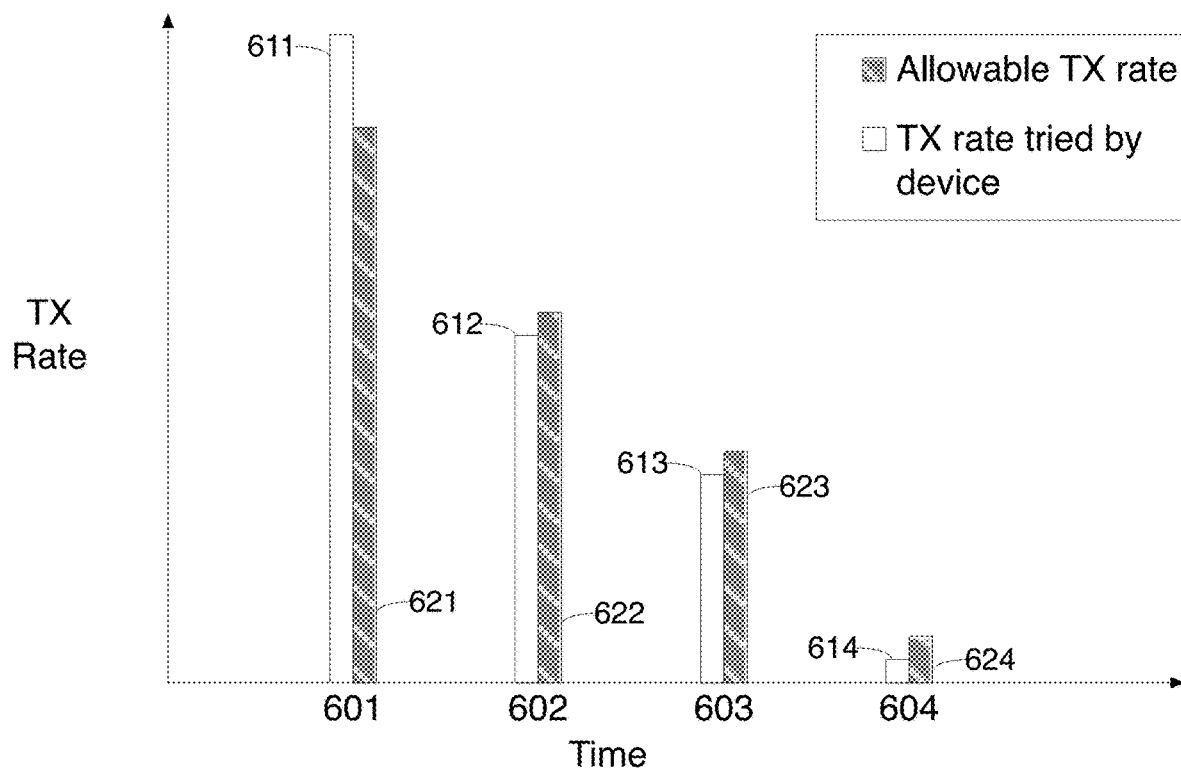
FIG. 6A is a graph depicting an embodiment of a timeline with transmission rates using one implementation of dynamic transmission rate selection.

FIG. 6A is a graph depicting an embodiment of a timeline with transmission rates using the dynamic transmission selection of FIG. 4. Similar to FIG. 3, when the distance between a first device and a second device is changing, then the possible or allowable maximum TX rate will vary over time due to the varying distance between the devices. For instance at time 601, the two devices may start relatively close to one another, and thus the maximum allowable TX rate based on the distance may be relatively high at 621. In some instances, the devices may move away from each other, and the maximum allowable TX rate may decrease: at time 602, for instance, the allowable TX rate may decrease to 622; at time 603, the allowable TX rate may yet again decrease to 623; and at time 602, the allowable TX rate may yet again decrease to 624.

Using the method described in relation to the flowchart of FIG. 4, at time 601, the first device, for example, an access point or mobile device, may select an initial TX rate 611 that may be greater than the allowable TX rate 621 at that time, as described in step 405 of FIG. 4. The transmission at the initial rate may fail, as described in step 415 of FIG. 4. The first device may then identify a second TX rate 602 as described in step 416 of FIG. 4. The second TX rate may be selected such that the second TX rate 612 will be lower than the allowable TX rate 622 at time 602. As described in step 416, the TX rate may be selected responsive to the relative velocity between the two devices or by a channel characteristic of the transmission. At time 603, the first device may select an even lower TX rate 613 such that it is lower than the allowable TX rate 623. Again, the lower TX rate may be selected as described in step 416. At time 604, yet another TX rate may be selected. Because the selected TX rate is lower than the allowable TX rate at times 602, 603 and 604, each transmission at those times may succeed. In some embodiments, at time 602, a first data packet may be transmitted, and at time 603, a second data packet may be transmitted. Likewise, at time 604, a third data packet may be transmitted. In some instances, if the TX rate selected by the first device is below a minimum threshold rate, then the first device may cease any further transmission with the second device.

Figure 6B:
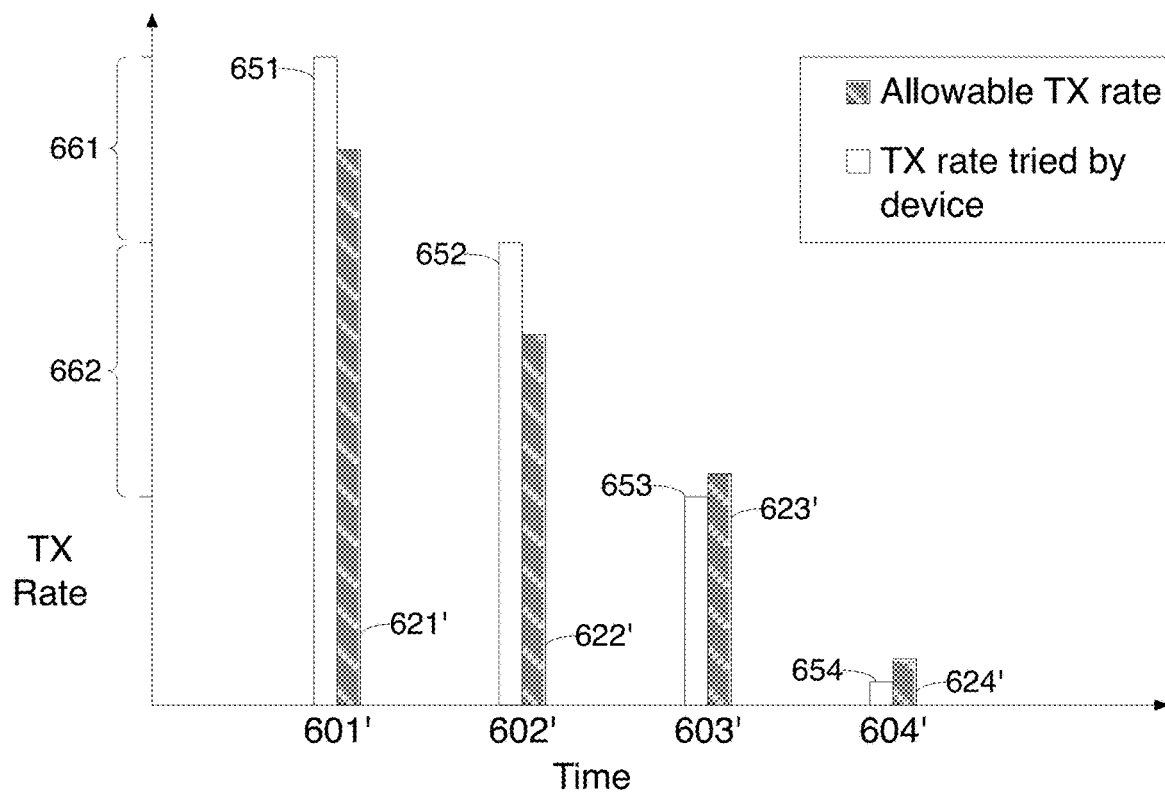
FIG. 6B is a graph depicting an embodiment of a timeline with transmission rates using another implementation of dynamic transmission rate selection.

FIG. 6B is a graph depicting an embodiment of a timeline with transmission rates using the dynamic transmission selection of FIG. 5. As described in relation to FIG. 3 and FIG. 6A, the allowable TX rates 621', 622', 623', and 624' may be limited by the distance between the two devices at different times of 601', 602', 603', and 604'. At time 601', the first device may select a first TX rate 651 as described in step 505 of FIG. 5. The transmission may fail due to the first TX rate 651 being greater than the allowable TX rate 621' at time 601'. The first device may select a second TX rate 652 as described in step 515. The second transmission may also fail because the second TX rate 652 may be greater than the allowable TX rate 622' at time 602'. The first device may then select a third TX rate 653, as described in step 525. The third rate may be selected such that a second difference 662 between the third rate and the second rate may be greater than a first difference 661 between the first rate and the second rate. The second difference 662 may be selected such that it is the first difference 661 multiplied by a correction factor. The correction factor may be determined by the relative velocity between the devices or by a channel characteristic of the second and/or first transmission. Because the selected third TX rate 653 may be less than the allowable TX rate 623', the third transmission may succeed. Upon a successful transmission, the first device may transmit a different data packet at time 604'. The TX rate 654 that the first device uses may be based on the previous TX rate 653, the first difference 661, and/or the second difference 662. In some embodiments, the fourth transmission may be not sent if the selected TX rate 654 is less than a predefined threshold.

Figure 6C:
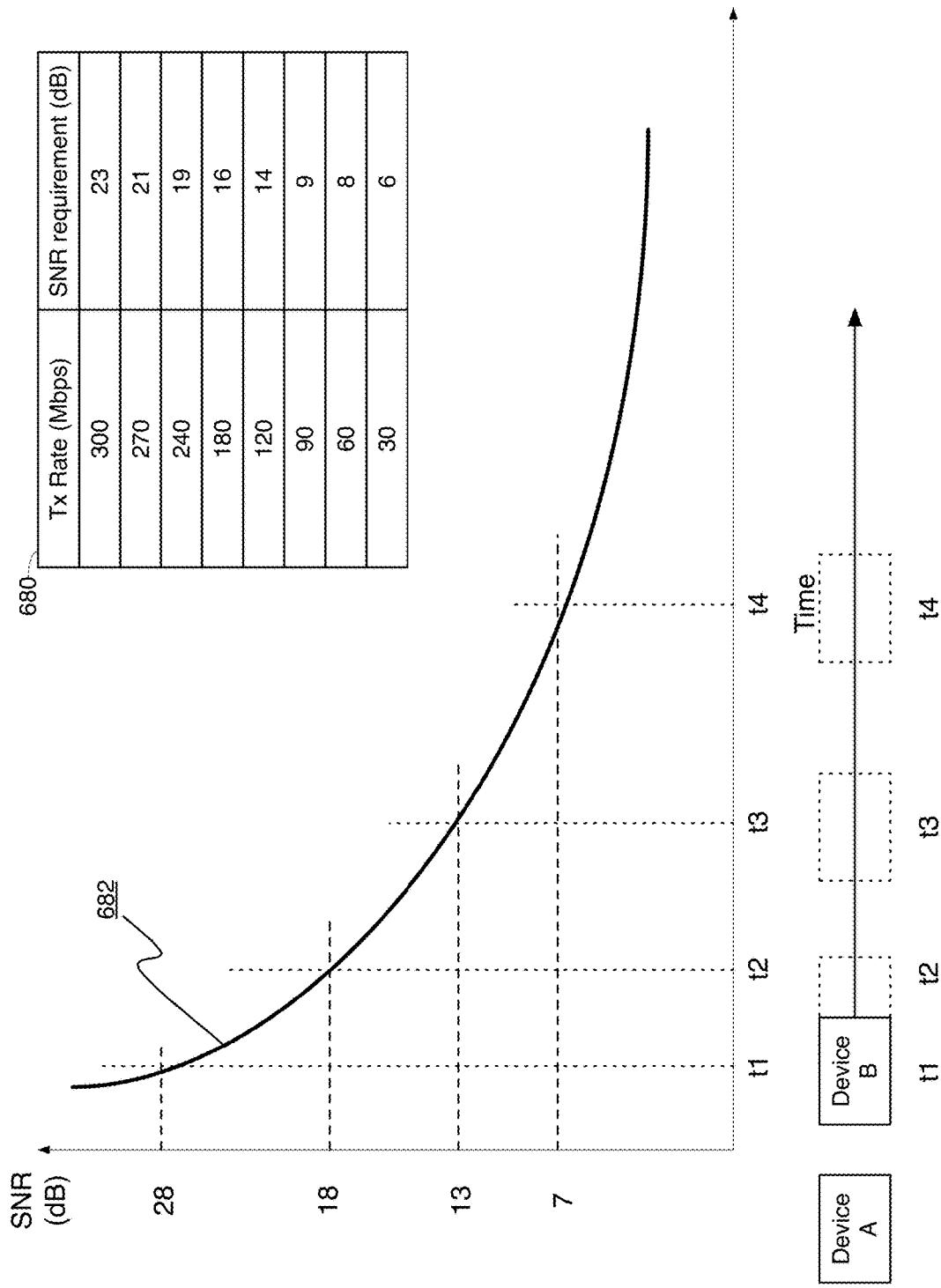
FIG. 6C is a graph depicting another embodiment of a timeline with transmission rates using another implementation of dynamic transmission rate selection.

FIG. 6C is another graph illustrating an implementation of dynamic rate selection. A device may include a predetermined list or table of transmission rates (and corresponding maximum signal to noise ratios for successful transmission) as shown in the example table 680. The device may have a plurality of predetermined rates from a maximum to a minimum level, and may be at predetermined intervals or may have varying intervals. As discussed above, in some implementations, upon determining that a transmission was unsuccessful (e.g. via a negative acknowledgement or a retransmission timeout), a device may select a next lower transmission rate. For example, given a first unsuccessful transmission at 300 Mbps, the device may attempt retransmissions at the subsequent rates of 270 Mbps, 240 Mbps, 180 Mbps, etc. However, such rate changes may be too slow in instances where the relative velocity between devices is high or the distance between the devices is rapidly changing.

For example, as shown, as a device (e.g. device B) moves away from a second device (e.g. device A), the signal to noise ratio (SNR) 682 of transmitted signal between the devices may vary, with the ratio growing smaller as the distance increased from a first time (t1) through to a later, fourth time t4. If a first transmission at a first rate (e.g. 300 Mbps) at time t1 fails, the device may attempt to perform a retransmission at time t2. If the device simply steps to the next transmission rate in the table (e.g. 270 Mbps), the required SNR may be 21 dB, but the actual SNR may be 18 dB as shown, and accordingly, the retransmission will fail. Similarly, the device may attempt a second retransmission at a next lower rate (e.g. 240 Mbps) with a required SNR of 19 dB, but the actual SNR at time t3 may be only 13 dB. Accordingly, when there is a high relative velocity between the devices, simply stepping through a table of transmission rates designed for relatively stationary devices may be inadequate or unsuccessful.

Instead, via the systems and methods discussed herein, the relative velocity between the two devices may be estimated to predict a SNR at the next retransmission time, and an appropriate transmission rate may be selected for the retransmission. In one such implementation, the actual SNR between the devices may be measured periodically or continuously (e.g. by measuring received signal strength of data transmissions or periodic pings or monitoring packets, in comparison to measured noise levels). Fluctuations or a rate of change of the SNR may be determined. For example and using the curve 682 illustrated in FIG. 6C, given a plurality of measurements of SNR before time t1 and/or between time t1 and t2, the device may project an estimated SNR at time t2 of 18 dB. If a transmission fails at time t1, then at time t2 when the device determines to perform a retransmission, the device may select from the transmission rate table 680 a rate with a corresponding SNR requirement below the estimated SNR, such as the 180 Mbps rate with the corresponding 16 dB SNR requirement. Similarly, based on measurements prior to t1, between t1 and t2, and/or between t2 and t3, the device may determine an estimated SNR at t3 of 13 dB. If a second retransmission is required, the device may select a transmission rate of 90 Mbps with a corresponding SNR requirement of 9 dB, less than the estimated 13 dB.

Thus, in some implementations, the device may select a retransmission rate by estimating, based on changes in relative positions of the device and another device, relative velocities between the devices, accelerations of either device, and/or measured received signal strengths or signal to noise ratios, an estimated signal to noise ratio of the connection at a retransmission time. The device may use the estimated signal to noise ratio to select a transmission rate having a corresponding required signal to noise ratio less than the estimated signal to noise ratio. In other implementations, other environmental or connection characteristics may be utilized (e.g. signal strength, block error rate, etc.), and the table may include similar corresponding requirements (e.g. required signal strength, required minimum block error rate, etc.) for each transmission rate.

Figure 7:
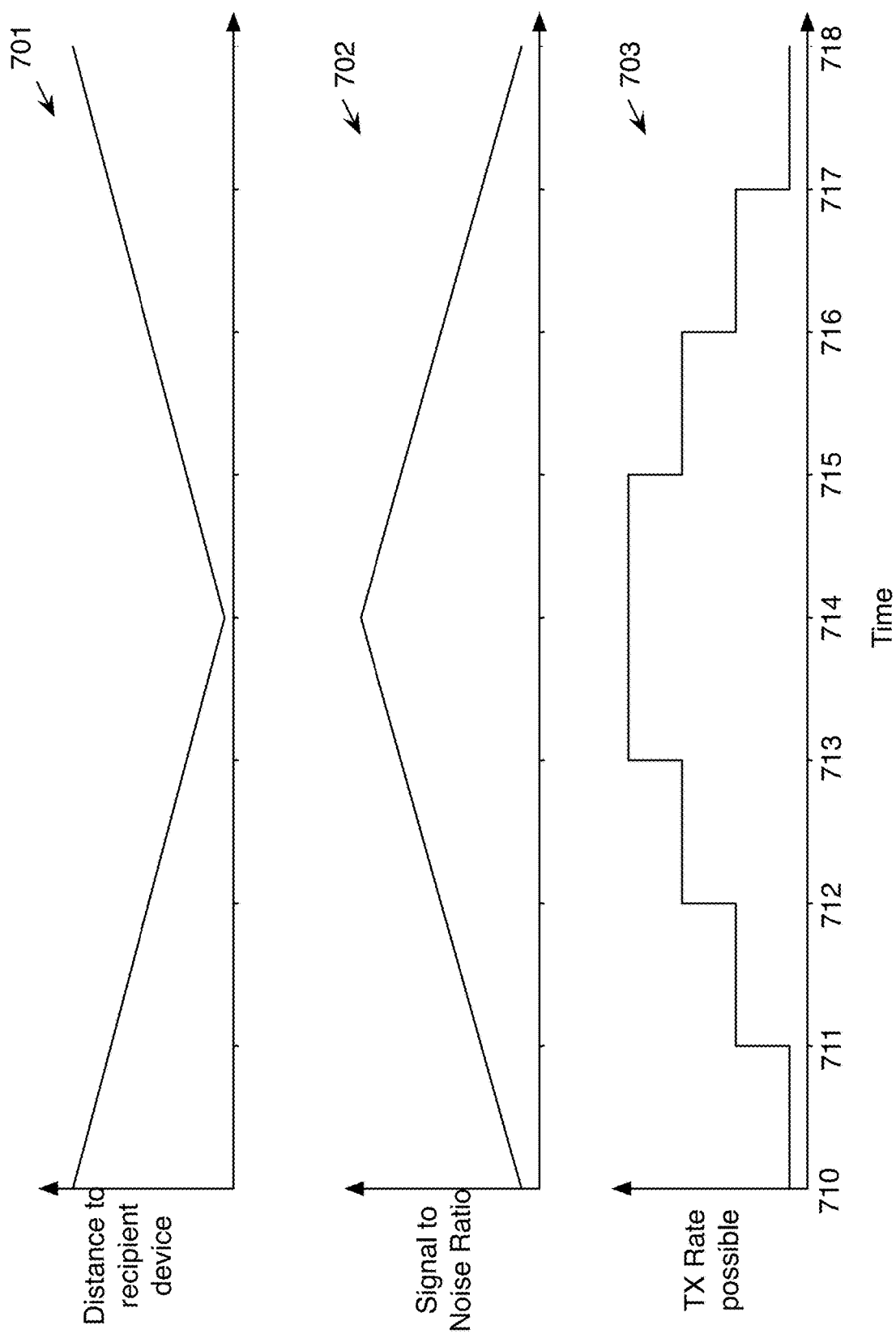
FIG. 7 is a set of graphs depicting embodiments of timelines that illustrate the illustrate the relationship between time, distance to access point, signal to noise ratio, and transmission rate possible.

FIG. 7 is a set of graphs depicting embodiments of timelines that illustrate the relationship between time, distance to recipient device, signal to noise ratio, and maximum transmission rate possible. Graph 701 shows the distance between a first device and a second device over time as one device approaches and then passes the other. At time 710, the distance between an access point and a client device may be relatively large compared to the distance at time 714. For example, the first device may be stationary and the second device may be in a vehicle that is approaching the first device, as in FIG. 1A. In another example, the first device may be approaching a stationary client device, or both the first device and a second device may be moving towards each other, as in FIG. 1B. As the devices approach each other, the distance between them decreases, from time 710 to time 711, then to time 712, then to time 713, and finally comes closest to each other at time 714. The devices may then move away from each other and the distance between the devices may increase from time 714, to time 715, to time 716, to time 717, and then to time 718. Graph 702 shows signal to noise ratio (SNR) over time and as the SNR relates to the distance between the devices. At time 710, SNR may be relatively small, due to the relatively large distance between the devices which may influence, for instance, interference, signal strength, and signal propagation. Over time, SNR may increase as the distance between the devices decrease. SNR may increase from time 710 to time 711, to time 712, to time 713, and to time 714. As distance increases, SNR may decrease from time 714 to time 715, to time 716, to time 717, and to time 718. Graph 703 shows TX rate possible over time, as it relates to SNR and distance. At time 710, due to a relatively low SNR, a relatively low TX rate may be possible in a transmission between the devices. As SNR increases due to the distance decreasing, the TX rate possible may increase over time. In some embodiments, the TX rate possible may increase in discrete steps, due to the specifications of the first device. In some embodiments, the TX rate possible may increase continuously. From time 710 to time 711, to time 712, and to time 713, TX rate possible may increase. Between time 713, to time 714 and time 715, the TX rate possible may be at a maximum TX rate for the first device and/or the second device. After time 715, as the SNR decreases and as the distance increase, the TX rate possible may decrease at time 716, time 717 and time 718. In some embodiments, if a TX rate is below a threshold, or if SNR is below a threshold, no transmission is sent. In some embodiments, the distance as graphed 701 or relative velocity may be used to select a transmission rate for a retransmission. In some embodiments, SNR as graphed 702 or another characteristic of a communication channel may be used to select a transmission rate for a retransmission. The selected retransmission rate may be less than the TX rate possible as graphed 703.

Figure 8:
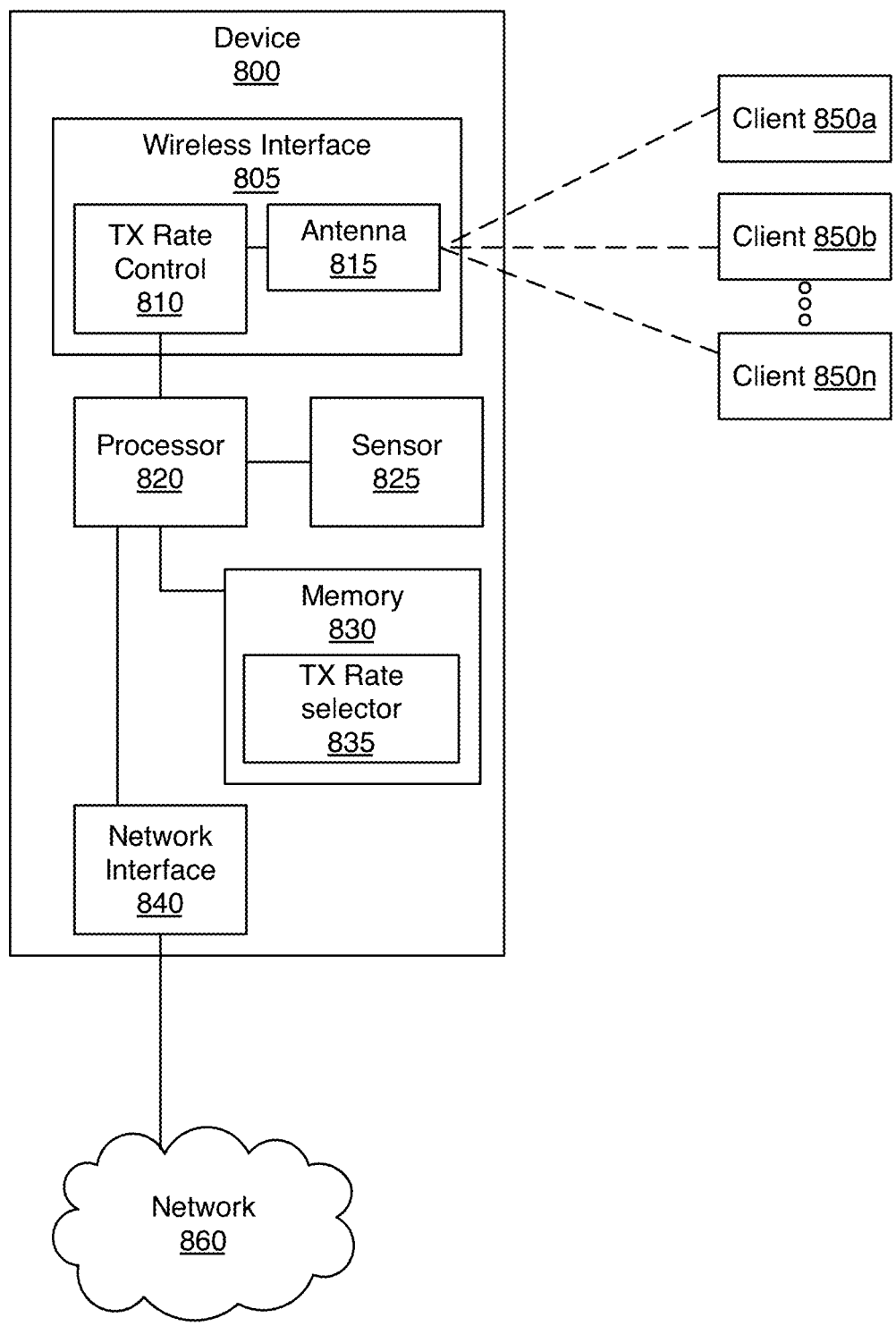
FIG. 8 is a block diagram illustrative of an embodiment of a system for dynamic transmission rate selection.

FIG. 8 is a block diagram illustrative of an embodiment of a system for dynamic transmission rate selection. In brief overview, the system may comprise a device 800 in communication with one or more clients 850a-n and a network 860. The device may comprise a wireless interface 805, a processor 820, a sensor 825, memory 830, and a network interface 840. The wireless interface 805 may comprise a TX rate control 810 and an antenna 815. The memory 830 may comprise TX rate selector 835.

Still referring to FIG. 8, the device 800 may be a wireless access point. The device 800 may be a router, or a wireless router. The device 800 and clients 850a-850n may be deployed as and/or executed on any type and form of computing device, such as a computer, network device or appliance capable of communicating on any type and form of network and performing the operations described herein. The device 800 may implement the set of networking standards specified by IEEE 802.11, or any other type and form of wireless communication standard. In other implementations, device 800 may be another client device, a desktop computer, a laptop computer, a server, a cellular tower, a gateway, a Bluetooth device, a radio frequency identifier (RFID) source or reader, or any other device used for wireless communications and capable of transmitting and receiving data at different rates.

The wireless interface 805 may comprise TX rate control 810 and antenna 815. The wireless interface 805 may be a network interface. The TX rate control 810 may tune the antenna 815 to a selected transmission rate. The antenna 815 may be capable of receiving and transmitting wireless signals of selected frequencies. In some embodiments, the wireless interface 805 may utilize a plurality of antennas and TX rate controls, for multiple-input and multiple-output wireless communication. In some embodiments, the antenna 815 may be tuned to a particular channel. In some embodiments, the antenna 815 may communicate at frequencies of 2.4 GHz, 3.6 GHz, 4.9 GHz, 5 GHz, 5.9 GHz, 60 GHz, or 900 MHz, or carrier frequencies within bands centered on such frequencies. In some embodiments, the antenna 815 may communicate at a specified channel bandwidths, for instance, at 20 MHz, 40 MHz, 80 MHz, or 160 MHz. In some embodiments, the antenna 815 may be used to allow channel bonding. In some embodiments, the antenna 815 may be used for beamforming or spatial filtering. In some embodiments, the antenna 815 may comprise multiple antennas.

The wireless interface 805 may be configured to transmit a data packet from the device 800 to one or more of the clients 850a-850n. The wireless interface 805 may transmit the data packet at a first rate, and it may also transmit the data packet at a second rate based on whether the first transmission has failed or responsive to other such retransmission determinations, as discussed above.

The clients 850a-850n (generally referred to as 850) may be any type of a computing device. For instance, a client 850 may be a mobile device, such as a laptop, tablet computer, smart phone, wearable computer, smart vehicle, or any other such device. In some embodiments, the client 850 may be an access point. A client 850 may have essentially same components as the device 800, such as a processor, memory, wireless interface, etc. The client 850 may be capable of receiving and sending transmissions from and to the device 800 through its own wireless interface.

The processor 820 is any logic circuitry that responds to and processes instructions fetched from the main memory unit 830. The processor 820 may also be referred to as central processing unit (CPU). The processor 820 may be a microcontroller, a microprocessor, or a digital signal processor core. In some embodiments, the processor 820 comprises multiple cores. In some embodiments, the device 800 may comprise a plurality of processor 820. In some embodiments, the processors may be part of a chipset. In some embodiments, the processor may be a multiple bit processor, such as a 16-bit, 32-bit, or a 64-bit processor. In some embodiments, the processor may be of a specific architecture, such as a Microprocessor without Interlocked Pipeline Stages (MIPS) architecture, x86 architecture, or an ARM architecture. In some embodiments, the processor 820 may be part of a system-on-a-chip (SoC). In some embodiments, the device 800 may further include a graphical processing unit (GPU).

In some embodiments, the processor 820 may communicate with or include cache memory. The processor 820 may communicate directly with cache memory via a secondary bus, sometimes referred to as a backside bus. In other embodiments, the processor 820 communicates with cache memory using a system bus. Cache memory typically has a faster response time than main memory 830 and is typically provided by SRAM, BSRAM, or EDRAM. The processor 820 may communicate with various sensors 825, the wireless interface 805, and the network interface 840 via a local system bus, which may be a VESA VL bus, an ISA bus, an EISA bus, a MicroChannel Architecture (MCA) bus, a PCI bus, a PCI-X bus, a PCI-Express bus, or a NuBus. In some embodiments, the processor 820 may use an Advanced Graphics Port (AGP) to communicate with a display. In some embodiments, the processor 820 may communicate with the sensor 825, wireless interface 805, and/or the network interface 840 via HyperTransport, Rapid I/O, or InfiniBand.

Main memory unit 830 may be one or more memory chips capable of storing data and allowing any storage location to be directly accessed by the microprocessor 820, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In some embodiments, the memory 830 may comprise a content-addressable memory (CAM) or a ternary content-addressable memory (TCAM). The main memory 830 may be based on any of the above described memory chips, or any other available memory chips capable of operating as described herein. The processor 820 may communicate with main memory 830 via a system bus. In some embodiments, the processor 820 communicates directly with main memory 830 via a memory port. In some embodiments, the device 800 may include one or more storage devices, such as a flash drive, a hard drive, a solid-state drive, an optical-disc drive and/or a USB drive.

The memory 830 may comprise a TX rate selector 835. The TX rate selector may be configured to select a transmission rate based on previous transmissions. For instance, if two earlier transmission have failed, the TX rate selector 835 may comprise code to take a difference of transmission rates of the two earlier transmission and to select a new transmission rate based on the difference. The TX rate selector 835 may further communicate with the sensor 825 and/or receive information from the wireless interface 805 to identify a relative velocity between the device and the second device, and to select a transmission rate based on the relative velocity. The TX rate selector 835 may further select a transmission rate based on a transmission channel characteristic of earlier transmissions.

Furthermore, the computing device 800 may include a network interface 840 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The wireless interface 805 may also be a type of network interface 840, and the network interface 840 may be wireless. The network interface 840 may comprise a built-in network adapter, network interface card, PCMCIA network card, card bus network adapter, wireless network adapter, USB network adapter, modem or any other device suitable for interfacing the computing device 800 to any type of network capable of communication and performing the operations described herein. For instance, the network interface 840 may be connected to a network 860 such as the Internet.

The device 800 may comprise one or more sensors 825. The sensor 825 may be an accelerator, a GPS, speedometer, altimeter, gravity sensor, gyroscope, rotational vector sensor, orientation sensor, and/or magnetometer. The sensor 825 may measure one or more of speed, velocity, movement, location, rotation, and/or orientation. The sensor 825 may relay a measurement to the processor 820 or write directly to memory 830.

The device 800 may display output and accept input. In some embodiments, the device 800 may send output signals and accept input signals through the network interface 840 or the wireless interface 805. A wide variety of I/O devices may be present in the computing device 800. Input devices include keyboards, mice, trackpads, trackballs, microphones, touch-enabled displays and drawing tablets. Output devices include video displays, speakers, and printers. The I/O devices may be controlled by an I/O controller. The I/O controller may control one or more I/O devices such as a keyboard and a pointing device, e.g., a mouse or optical pen. Furthermore, an I/O device may also provide storage and/or an installation medium for the computing device 800. In still other embodiments, the computing device 800 may provide USB connections to receive handheld USB storage devices.

In some embodiments, the computing device 800 may comprise or be connected to multiple display devices, which each may be of the same or different type and/or form. As such, any of the I/O devices 130a-130n and/or the I/O controller may comprise any type and/or form of suitable hardware, software, or combination of hardware and software to support, enable or provide for the connection and use of multiple display devices by the computing device 800. For example, the computing device 100 may include any type and/or form of video adapter, video card, driver, and/or library to interface, communicate, connect or otherwise use the display devices. In one embodiment, a video adapter may comprise multiple connectors to interface to multiple display devices. In other embodiments, the computing device 800 may include multiple video adapters, with each video adapter connected to one or more of the display devices. In some embodiments, any portion of the operating system of the computing device 800 may be configured for using multiple displays. In other embodiments, one or more of the display devices may be provided by one or more other computing devices connected to the computing device 800, for example, via a network 860. These embodiments may include any type of software designed and constructed to use another computer's display device as a primary or a second display device for the computing device 800. In some embodiments, the device 800 will send user interface information via the network interface 840 or the wireless interface 805 that allows an administrator to set options on the device 800 over a network 860. One ordinarily skilled in the art will recognize and appreciate the various ways and embodiments that a computing device 800 may be configured to have multiple display devices.

In further embodiments, an I/O device may be a bridge between the system bus and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

The device 800 may comprise one or more operating systems, which control scheduling of tasks and access to system resources. The computing device 800 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS NT, WINDOWS CE, WINDOWS 7, WINDOWS 8, and WINDOWS 10, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Canonical Ltd. of London, United Kingdom, or any type and/or form of a Unix operating system, among others. In some embodiments, the device 800 may comprise an operating system designed for routers or wireless routers.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method for wireless retransmission rate selection, comprising:
    transmitting, by a first device to a second device at a first time, a data packet at a first rate;
    monitoring an acceleration of the first device or a change in position of the first device from an identified stationary position of the first device;
    determining, by the first device, to retransmit the data packet;
    measuring, by the first device, a transmission parameter of a communication channel between the first device and the second device;
    identifying, by the first device, a rate of change of the measured transmission parameter based at least in part on the monitored acceleration or change of position;
    determining, by the first device, that the identified rate of change exceeds a threshold rate of change;

selecting, by the first device, a second rate for retransmission of the data packet at a second time, responsive to the determination that the identified rate of change exceeds the threshold rate of change, the second rate lower than the first rate; and retransmitting the data packet, by the first device to the second device at the second time, at the second rate selected responsive to the determination that the identified rate of change exceeds the threshold rate of change.

2. The method of claim 1, further comprising selecting the second rate from a plurality of potential transmission rates, each of the plurality of potential transmission rates corresponding to a required value for the transmission parameter of the communication channel between the first device and the second device.

3. The method of claim 2, wherein selecting the second rate from the plurality of potential transmission rates further comprises estimating a value for the monitored transmission parameter at the second time, based on the rate of change of the monitored transmission parameter; and selecting a fastest transmission rate of the plurality of potential transmission rates having a corresponding required value for the transmission parameter less than the estimated value.

4. The method of claim 3, wherein estimating the value for the monitored transmission parameter at the second time further comprises estimating the value for the monitored transmission parameter at the second time based on a plurality of measurements of the transmission parameter prior to the first time.

5. The method of claim 2, wherein the transmission parameter comprises a signal to noise ratio of the communication channel.

6. The method of claim 2, wherein the transmission parameter comprises a minimum signal strength of a transmission by the second device.

7. The method of claim 2, wherein the transmission parameter comprises a maximum block error rate of the communication channel.

8. A system for wireless retransmission rate selection, comprising:
   a first device comprising a wireless network interface and a processor executing a transmission rate selector;
   wherein the network interface is configured to transmit a data packet from the first device to a second device at a first rate at a first time, and retransmit the data packet from the first device to the second device at a second rate at a second time; and
   wherein the transmission rate selector is configured to:
      monitor an acceleration of the first device or a change in position of the first device from an identified stationary position of the first device,
      measure a transmission parameter of the communication channel between the first device and second device,
      identifying a rate of change of the measured transmission parameter based at least in part on the monitored acceleration or change of position,
      determine that the identified rate of change exceeds a threshold rate of change, and
      select the second rate for retransmission of the data packet at the second time, responsive to the determination that the identified rate of change exceeds the threshold rate of change, the second rate lower than the first rate.

9. The system of claim 8, wherein the transmission rate selector is configured to select the second rate from a plurality of potential transmission rates, each of the plurality of potential transmission rates corresponding to a required value for the transmission parameter of the communication channel between the first device and the second device.

10. The system of claim 8, wherein the transmission rate selector is configured to estimate a value for the monitored transmission parameter at the second time, based on the rate of change of the monitored transmission parameter; and select a fastest transmission rate of the plurality of potential transmission rates having a corresponding required value for the transmission parameter less than the estimated value.

11. The system of claim 10, wherein the transmission rate selector is configured to estimate the value for the monitored transmission parameter at the second time based on a plurality of measurements of the transmission parameter prior to transmitting the data packet at the first time.

12. The system of claim 9, wherein the transmission parameter comprises a signal to noise ratio of the communication channel.

13. The system of claim 9, wherein the transmission parameter comprises a minimum signal strength of a transmission by the second device.

14. The system of claim 9, wherein the transmission parameter comprises a maximum block error rate of the communication channel.

* * * * *